(12) United States Patent
Khoryaev et al.

(10) Patent No.: US 12,185,187 B2
(45) Date of Patent: Dec. 31, 2024

(54) DISTRIBUTED RESOURCE MANAGEMENT MODE FOR NR POSITIONING

(71) Applicant: Intel Corporation, Santa Clara, CA (US)

(72) Inventors: Alexey Khoryaev, Nizhny Novgorod (RU); Sergey Sosnin, Zavolzhie (RU); Mikhail Shilov, Nizhny Novgorod (RU); Sergey Panteleev, Nizhny Novgorod (RU); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 17/062,143

(22) Filed: Oct. 2, 2020

(65) Prior Publication Data

US 2021/0029507 A1    Jan. 28, 2021

Related U.S. Application Data

(60) Provisional application No. 62/911,112, filed on Oct. 4, 2019.

(51) Int. Cl.
| | |
|---|---|
| *H04W 4/029* | (2018.01) |
| *H04L 5/00* | (2006.01) |
| *H04L 67/52* | (2022.01) |
| *H04W 4/021* | (2018.01) |

(52) U.S. Cl.
CPC ......... *H04W 4/029* (2018.02); *H04L 5/0048* (2013.01); *H04L 67/52* (2022.05); *H04W 4/021* (2013.01)

(58) Field of Classification Search
CPC ....... H04W 4/029; H04W 4/021; H04W 4/02; H04L 5/0048; H04L 67/52; H04L 5/0069; H04L 67/12; H04L 67/566; H04L 67/60
See application file for complete search history.

(56) References Cited

U.S. PATENT DOCUMENTS

| | | | |
|---|---|---|---|
| 2010/0172311 A1* | 7/2010 | Agrawal | H04L 1/1893 370/329 |
| 2012/0027110 A1* | 2/2012 | Han | H04L 5/0007 375/260 |
| 2020/0266942 A1* | 8/2020 | Akkarakaran | H04L 5/0069 |
| 2020/0275401 A1* | 8/2020 | Priyanto | G01S 1/042 |
| 2020/0351813 A1* | 11/2020 | Manolakos | G01S 5/0236 |
| 2022/0124664 A1* | 4/2022 | Cha | G01S 5/02 |

* cited by examiner

*Primary Examiner* — Kabir A Timory
(74) *Attorney, Agent, or Firm* — Schwabe, Williamson & Wyatt, P.C.

(57) ABSTRACT

Embodiments disclosed herein are directed to new mechanisms of resource allocation for transmission of positioning or ranging (e.g., sounding) reference signals. The embodiments may provide flexible and/or efficient resource allocation, and may improve accuracy of user positioning. The techniques described herein may be applied for multiple use cases, including UAS, V2X, IIoT, etc.

20 Claims, 11 Drawing Sheets

Example of 4 different cases of estimated UE coordinate intersection with geo-zone Figure 1: Type of geo zoning partitioning enabling UL PRS transmission in NR V2X Figure 2: Example of 4 different cases of estimated UE coordinate intersection with geo-zone Figure 3: An example of PRS Tx period dependency from UE speed, acceleration, heading change Figure 4: An example of additional PRS transmissions triggered by increased absolute acceleration value Figure 5: An example of additional PRS transmissions triggered by heading changing

DISTRIBUTED RESOURCE MANAGEMENT MODE FOR NR POSITIONING

CROSS REFERENCE TO RELATED APPLICATION

The present application claims priority to U.S. Provisional Patent Application No. 62/911,112, which was filed Oct. 3, 2019, the disclosure of which is hereby incorporated by reference.

FIELD

Embodiments relate generally to the technical field of wireless communications.

BACKGROUND

Legacy wireless communication networks are optimized to provide highest feasible quality of service (QoS) under limited amount of allocated spectrum resources so that system efficiency is maximized. Nowadays, there is a clear trend in many wireless applications, that communication systems in order to optimize the overall system performance require knowledge of accurate user coordinate and eventually use location information for radio-resource management. Support of accurate user positioning is one of the main components of modern cellular communication systems like 5G, especially when it is applied for Unmanned Aerial Systems (UAS), vehicular (e.g., vehicle-to-everything (V2X)), or industrial Internet of Things (IIoT) applications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
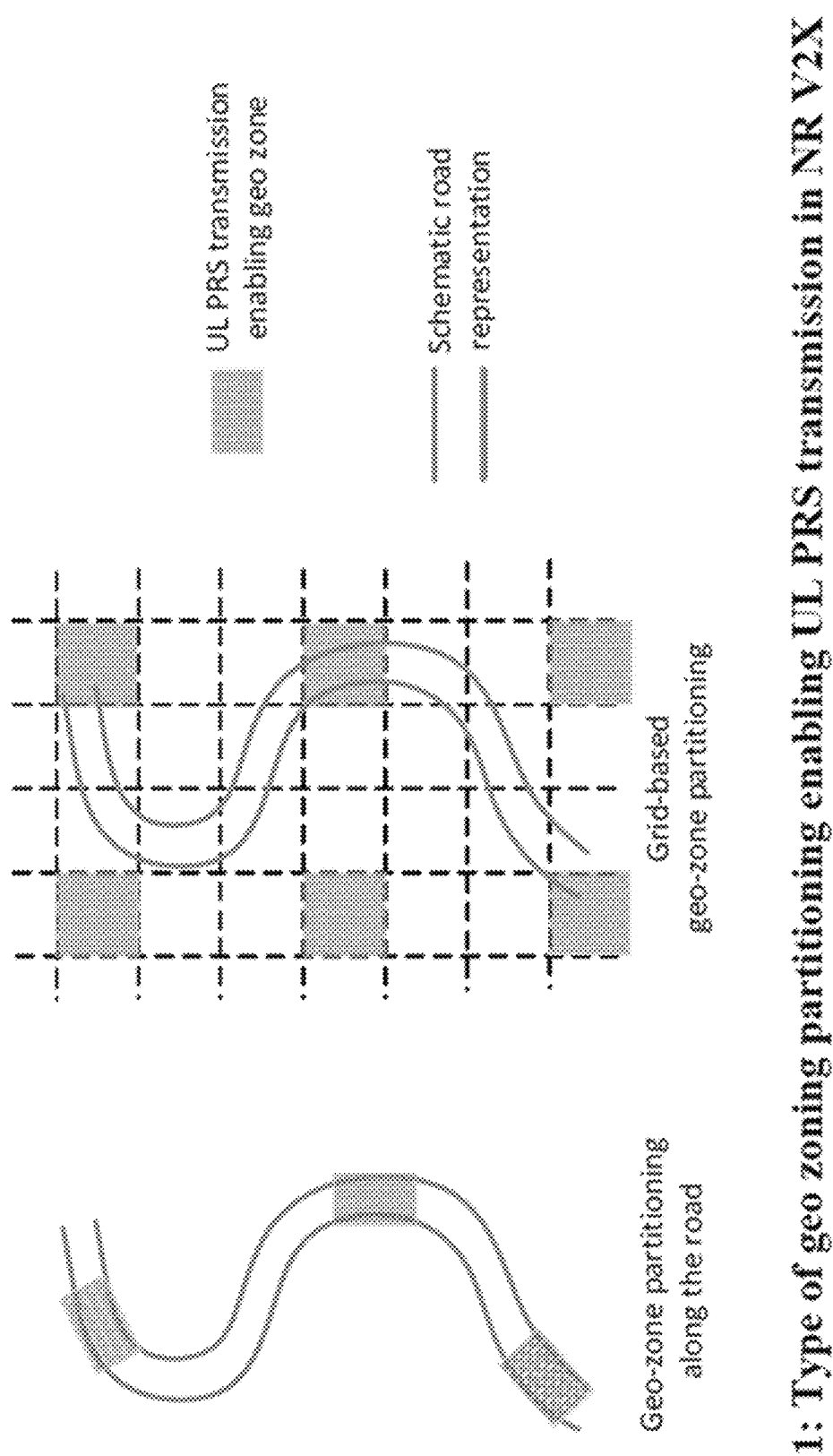
FIG. 1 illustrates an example of geo zoning partitioning enabling uplink (UL) positioning reference signal (PRS) transmission in New Radio (NR) vehicle-to-everything (V2X), in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments disclosed herein are directed to new mechanisms of resource allocation for transmission of positioning or ranging (e.g., sounding) reference signals. The embodiments may provide flexible and/or efficient resource allocation, and may improve accuracy of user positioning. The techniques described herein may be applied for multiple use cases, including UAS, V2X, IIoT, etc.

Legacy implementations based on radio access technology (RAT)-dependent techniques rely on pre-configuration of downlink (DL) PRS transmission schedule to user terminals. Transmission of DL PRS resources by a given transmission-reception point (TRP) can be coordinated at the network level to avoid or reduce probability of collisions. In uplink (UL), resources used for NR UL positioning (e.g. UL sounding reference signal (SRS) transmission or physical random access channel (PRACH)) are also configured through next generation NodeB (gNB).

The legacy implementations require coordination for transmission of reference signals for positioning/ranging purpose and cannot be used in distributed communication environment, rather rely on centralized approaches such as allocation of resources for PRS/ranging signal transmissions/scheduling.

Embodiments herein provide for transmission of positioning and/or ranging (e.g., sounding) signals. The design principles are described based on V2X applications. However, the techniques may be generalized for other scenarios including UAS and IIoT. Some embodiments described herein may rely on the use of geographical location information to further improve user positioning accuracy and assist management of radio-resources utilized for transmission of positioning, ranging (sounding) reference signals that can be applied in distributed communication systems.

Implementation of the techniques described herein may increase accuracy in determining positioning or distance between two objects, as well as providing a new mechanism for NR sidelink or uplink transmission scheduling (e.g. grant-free transmission).

NR V2X UL PRS Resource Configuration and Transmission Schedule

Embodiments described herein can be used by UEs such as for example vehicle UEs, pedestrian UEs, drones, and/or industrial Internet of Things (IoT) UEs in order to improve accuracy of positioning through ranging with other stations (e.g. other UEs or gNBs with predetermined coordinates). Embodiments described herein may be directed to the transmission of positioning reference signals (e.g. downlink, uplink or sidelink ranging signals) in order to measure round trip time (RTT) and therefore distance between two objects. In other embodiments (e.g. synchronized deployments), the estimation of the timing of signal arrival may give information on time of flight and can be used instead. In distributed communication networks such as for example network of vehicles, drones, the major problem for ranging signal transmission is the resource selection. In particular, which resources to use for transmission to reduce effect of collision and support spatial reuse. In order to address this, the following embodiments based on a priori knowledge of coarse geo-graphical location may be used. In particular one or a combination of the following approaches can be used for transmission of reference signals on pre-configured resources (e.g. uplink or sidelink resources):

Random Resource Selection
    In this case, UE randomly picks the one of the resources within predefined grid of resources and initiates transmission of PRS signal.
    It is assumed that all other PRS signal transmission parameters are pre-configured, e.g. size of resources and number of resources, as well as set of sequences that can be used, etc.

Predefined Resource Selection or Pseudo-Random Resource Selection
    In this case UE derives resource for transmission based on predefined ID (e.g. UE source ID) or based on results of sensing and resource selection procedure. In this case, it is assumed that either predefined mapping between physical channels and reference signals is established or there is a predefined function of resource ID and any of UE ID. Similar to random resource selection, it is assumed that all other PRS signal transmission parameters are pre-configured, e.g. size of resources and number of resources, as well as set of sequences that can be used, etc.
    Resource selection based on UE geo-location/telematics information. In this case, resource selection for transmission takes into account UE geo-location/telematics information. The geo-location information such as UE coordinate, UE presence in certain geo-zone, or within a certain range/distance from other object (e.g. road side unit (RSU)) may serve as an event to trigger resource selection for subsequent PRS transmission on predefined resource grid. In particular, one or more of the following examples of geo-location/telematics information may be used to trigger PRS transmission.
    Location-based triggering: geo-based UE PRS transmission (e.g. UE has passed or is about to pass) the certain lane on the road or is inside of the predefined zone)
    Velocity (Speed)-based triggering: UL PRS transmission is triggered if UE exceeds certain speed threshold or travel distance since the moment of the latest PRS transmission, or its speed has been changed on certain amount.
    Acceleration-based triggering: UL PRS transmission is triggered if UE exceeds the pre-defined acceleration threshold or keeping it's acceleration inside of the pre-defined acceleration value range.
    Heading change triggering: UL PRS transmission is triggered by the case when UE changes the direction of travel or even caused by the wheel rotation. UE changes the movement direction or change the wheel rotation angle.

Resource selection based on signaling from other UE/RSU/TRP/gNB
    For example, nearby RSU can assign or broadcast the initiating signal for PRS transmission with dynamic configurable parameters UE-Based Resource Selection Mechanism for PRS Resource Selection for PRS Transmission
    Resource for PRS transmission is selected according to resource selection procedure for data transmission
    Resource for PRS transmission is selected separately from data transmission resource selection procedure
    Resource configuration based on UE physical parameters is described more precisely in the following sections.

UL Physical Condition for UL PRS Resource Selection
    Principally new approach on resource management procedure contains in the idea of resource selection for UL PRS transmission based on one or a combination of following user's physical parameters:
    Geographical location
    Mobility
    Dynamic characteristics: speed, acceleration
    Heading changing intensity Geographical Location Based Resource Selection for PRS
    A special geographical zone can be defined in the pre-defined coordinate system, which allows UE located inside (entering or passing away this zone) to transmit positioning signal. Each V2X user is configured with predefined geographical areas activating/triggering the PRS transmission. In general case, each zone can be associated with different PRS transmission parameters (e.g. set of resource elements (Res), symbols, cyclic shift, and/or cover codes, etc.). For PRS transmission, UE is expected to select parameters associated with the specific geo-zone or geo-location information and transmit predefined positioning reference signal once it has reached the corresponding zone.
    This technique relies on spatial reuse and can enable reliable transmission and reception of PRS to perform precise ranging procedure. In addition, UEs involved into the ranging procedure are aware with some level of uncertainty on the search window for PRS reception.

Figure 2:
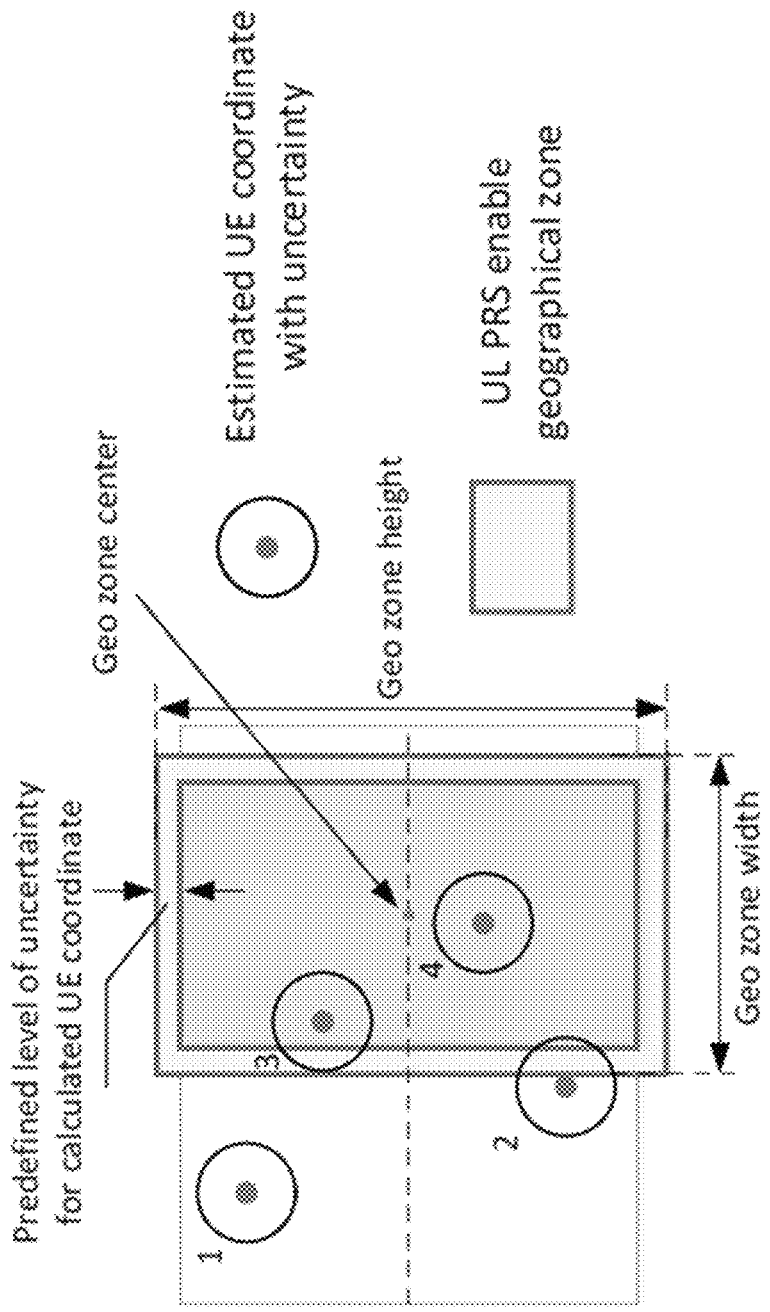
FIG. 2 illustrates example cases of estimated user equipment (UE) coordinate intersection with geo-zone, in accordance with various embodiments.
Figure 3:
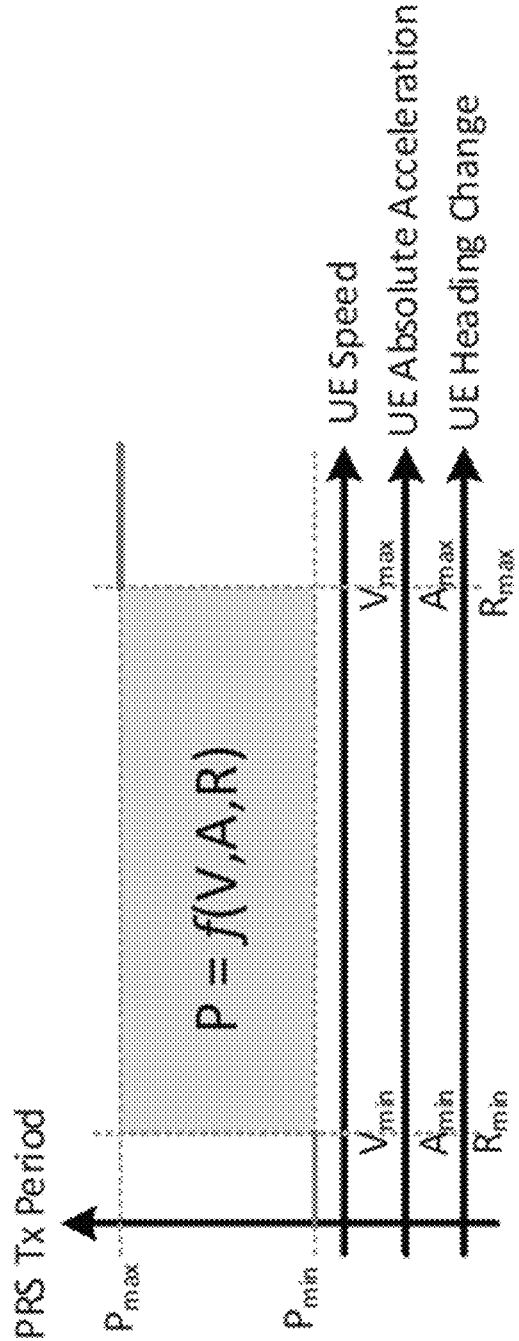
FIG. 3 illustrates an example of PRS transmission (Tx) period dependency on UE speed, acceleration, and/or heading change, in accordance with various embodiments.
Figure 4:
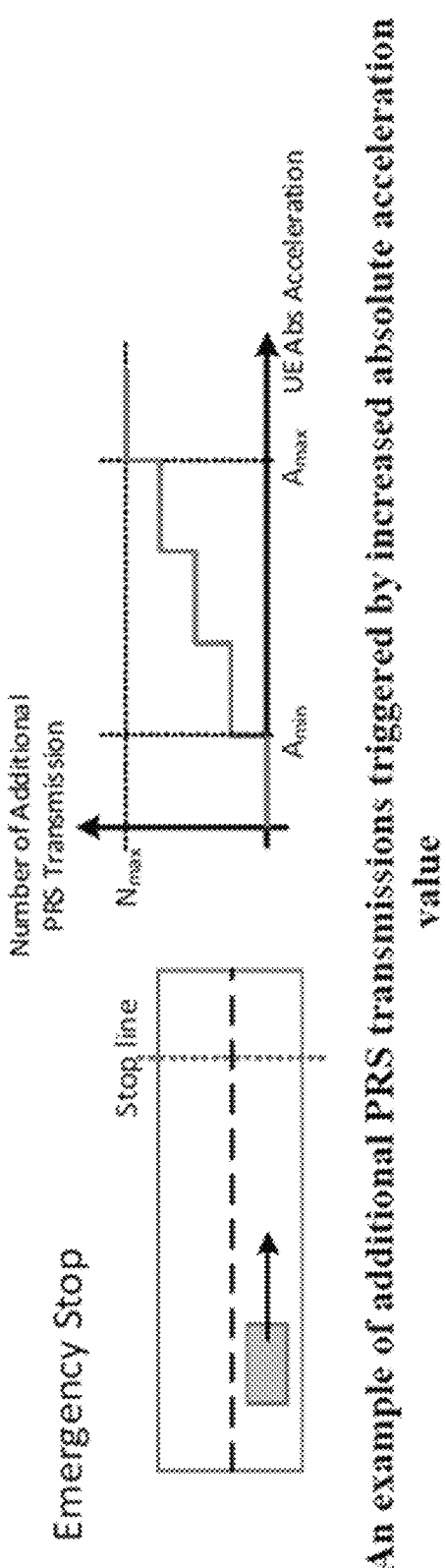
FIG. 4 illustrates an example of additional PRS transmissions triggered by increased absolute acceleration value, in accordance with various embodiments.
Figure 5:
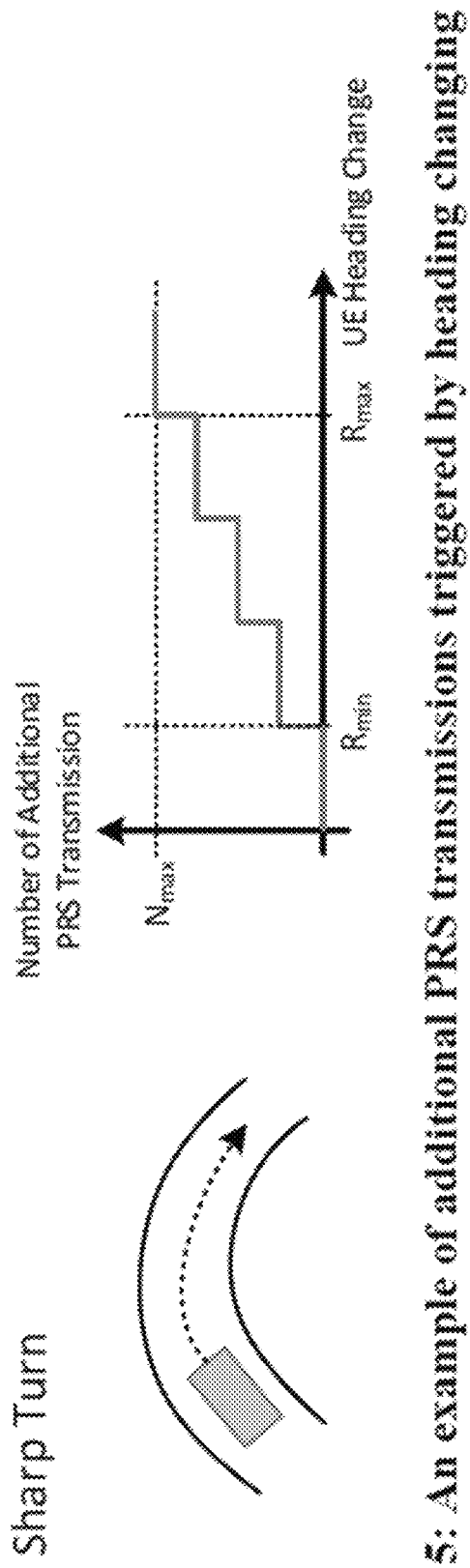
FIG. 5 illustrates an example of additional PRS transmissions triggered by a heading change, in accordance with various embodiments.
Figure 6:
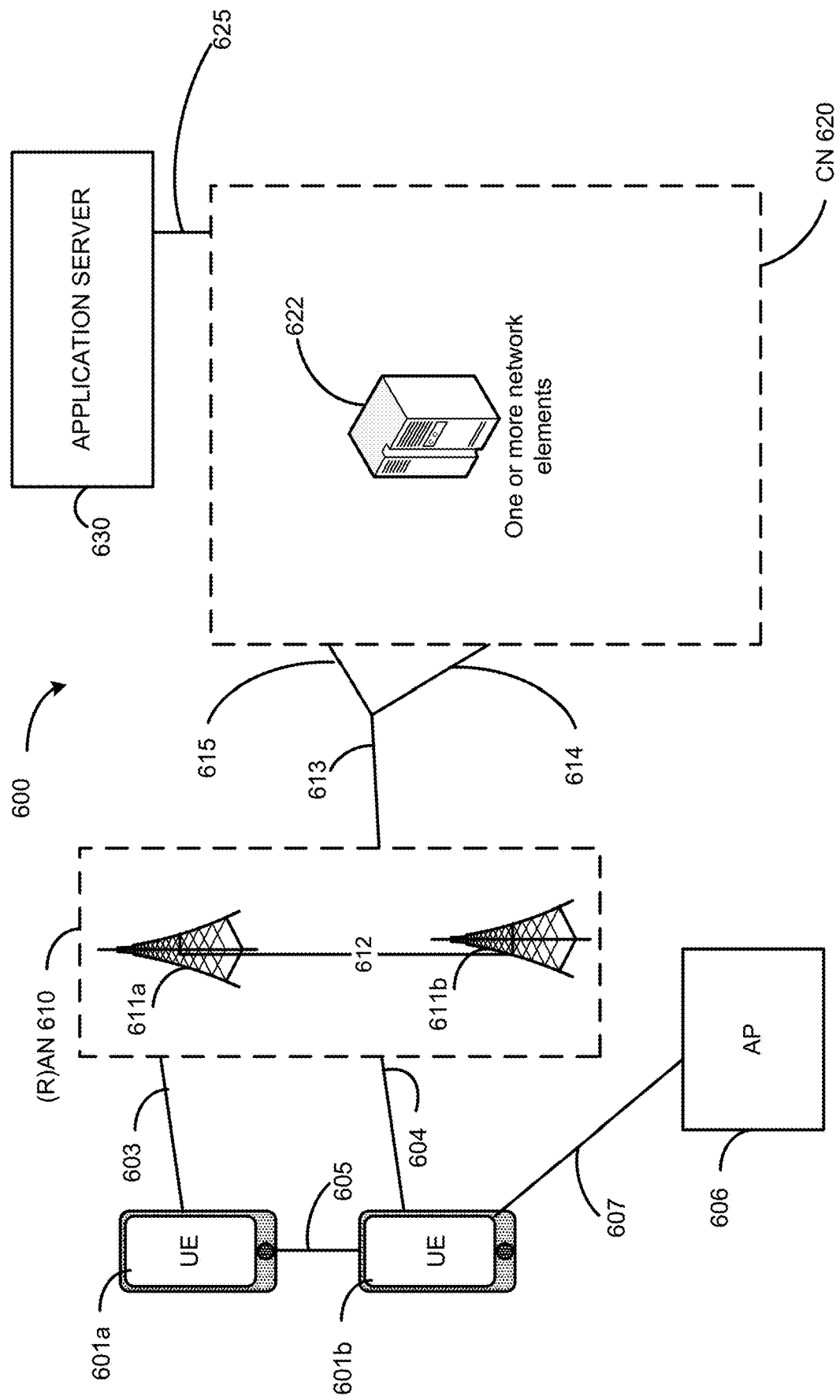
FIG. 6 illustrates an example architecture of a system of a network, in accordance with various embodiments.

Geo Zone Determination Mechanism
    Geo Zone Partitioning Type:
    Predefined geo zoning based on global grid partitioning. This type of zoning can be easily defined but the main drawback of this approach is non-optimized distribution of the geo zones.
    Predefined geo zoning along the road. This approach is very flexible and efficient from scheduling point of view, but it requires deployment-specific configuration.
    The principle of zoning (e.g. zoning procedure) can be implemented at V2X application layers or at RRC layer. If the UE recognizes based on geo-location information that predefined conditions are met, then event to select resource for PRS transmission can be triggered and corresponding signals can be transmitted accordingly.
    One or a combination of following options can be used for road specific geo zone description:

Description of Geo Zone as 2D Rectangular:
    Center of rectangular is defined as a point in the 2D or 3D coordinate system
    Rectangular length and width and height are defined Description of Geo Zone as 3D Boxes:
  Center of parallelepiped is defined as a point in the 3D coordinate system
  Parallelepiped length, width and altitude are defined
Description of Geo Zone as 2D Circle:
  Center of circle is defined as a point in the 2D or 3D coordinate system
  Circle radius is defined
Description of Geo Zone as 3D Sphere:
  Center of sphere is defined as a point in the 3D coordinate system
  Sphere radius is defined
Description of Geo Zone Based on Set of Coordinates
  Set of coordinates in 2D or 3D coordinate space, forming convex figure
    Any other options or objects can be used to describe zone in 1, 2 or 3D spaces
UE Behavior and Handling Uncertainty of Coordinate Position FIG. 2 contains green rectangular which illustrates the geographical zone triggering the PRS transmission and 4 possible relative positioning of a UE to this geographic zone. Four different positions can be specified and for each of these positions, the specific UE behavior is provided:
  Position 1, UE coordinate with uncertainty radius is outside of the described geo zone
  A UE does not transmit any PRS
    (Position 2) UE coordinate is outside of the described geo zone, the uncertainty radius overlaps the described geo zone OR (Position 3) UE coordinate is within of the described geo area, the uncertainty radius is partially out of the geo area, following UE behavior are applied:
  Predefined uncertainty threshold associated with the geo zone is bigger than the UE position uncertainty, UE can transmit the UL PRS
  Predefined uncertainty threshold determined for the geo zone is less than the UE coordinate uncertainty, UE cannot transmit UL PRS
    Position 4, UE coordinate with uncertainty radius is within of the described geo area
    A UE can transmit UL PRS.
  In case if a UE stops in a geographical zone dedicated for UL PRS transmission, the UL PRS transmission triggering mechanism based on geographical zones is disabled.
UL PRS Resource Selection Based on UE Mobility
  Speed and acceleration parameters directly describe the dynamic characteristic of a UE, thus, the UE mobility can be an additional configuration parameter for UL PRS transmission. High UE speed, acceleration or heading change implies on more intensive location update, which should be estimated in the system. Following UL PRS parameters can be controlled by UE mobility:
  Periodicity of UL PRS transmission
  Instant UL PRS transmission
  Other parameters: bandwidth for UL PRS, Tx power,
    Number of symbols allocated for UL PRS transmission, number of repetition of UL PRS inside of the same PRS period
Periodicity of UL PRS Transmission
  System defines the speed threshold value above which a UE can transmit UL PRS with maximum periodicity, the maximum UL PRS transmission period size is defined in the system.
  System defines the speed threshold value below which a UE can transmit UL PRS with minimum periodicity, the minimum UL PRS transmission period size is defined in the system.
  System defines dependency of UL PRS transmission periodicity from UE speed value.
  System defines the acceleration threshold value above which a UE can transmit UL PRS with maximum periodicity, the maximum UL PRS transmission period size is defined in the system.
  System defines the acceleration threshold below which a UE can transmit UL PRS with minimum periodicity, the minimum UL PRS transmission period size is defined in the system.
  System defines dependency of UL PRS transmission periodicity from UE acceleration value.
  System defines the heading change threshold value above which a UE can transmit UL PRS with maximum periodicity, the maximum UL PRS transmission period size is defined in the system.
  System defines the heading change threshold below which a UE can transmit UL PRS with minimum periodicity, the minimum UL PRS transmission period size is defined in the system.
  System defines dependency of UL PRS transmission periodicity from UE heading change value.
Instant UL PRS Transmission Triggers
  UE initiates single or a set of UL PRS transmissions in case if it's instance acceleration absolute value exceeds the defined value (e.g. Intensive speed increasing or decreasing). Emergency stop or intensive acceleration affects the dynamic characteristic of the UE and the location estimation can be worsen, in order to clarify the location the additional PRS transmissions can be transmitted.
  UE initiates single instant or a set of UL PRS transmissions in case if the UE changes its heading. Intensive UE heading changing implies on unpredictable UE location changing and affects the location estimation, in order to clarify the location the additional PRS transmissions can be transmitted.
Other Parameters for UL PRS Transmission
  UE mobility can configure other UL PRS parameters such as:
    Number of symbols allocated for UL PRS transmission
    Number of repetition of UL PRS inside of the same PRS period
    Bandwidth allocated for UL PRS transmission
  As a result, the combination of UE speed, acceleration and heading change configures parameters of UL positioning reference signal.
Systems and Implementations FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 601a and UE 601b (collectively referred to as "UEs 601" or "UE 601"). In this example, UEs 601 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 601 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with an or RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601b is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to be connected to the Internet without connecting to the core network of the wireless system (described in further detail below). In various embodiments, the UE 601b, RAN 610, and AP 606 may be configured to utilize LWA operation and/or LWIP operation. The LWA operation may involve the UE 601b in RRC_CONNECTED being configured by a RAN node 611a-b to utilize radio resources of LTE and WLAN. LWIP operation may involve the UE 601b using WLAN radio resources (e.g., connection 607) via IPsec protocol tunneling to authenticate and encrypt packets (e.g., IP packets) sent over the connection 607. IPsec tunneling may include encapsulating the entirety of original IP packets and adding a new packet header, thereby protecting the original header of the IP packets.

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 611 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 611; a MAC/PHY split wherein RRC, PDCP, RLC, and MAC layers are operated by the CRAN/vBBUP and the PHY layer is operated by individual RAN nodes 611; or a "lower PHY" split wherein RRC, PDCP, RLC, MAC layers and upper portions of the PHY layer are operated by the CRAN/vBBUP and lower portions of the PHY layer are operated by individual RAN nodes 611. This virtualized framework allows the freed-up processor cores of the RAN nodes 611 to perform other virtualized applications. In some implementations, an individual RAN node 611 may represent individual gNB-DUs that are connected to a gNB-CU via individual F1 interfaces (not shown by FIG. 6). In these implementations, the gNB-DUs may include one or more remote radio heads or RFEMs (see, e.g., FIG. 7), and the gNB-CU may be operated by a server that is located in the RAN 610 (not shown) or by a server pool in a similar manner as the CRAN/vBBUP. Additionally or alternatively, one or more of the RAN nodes 611 may be next generation eNBs (ng-eNBs), which are RAN nodes that provide E-UTRA user plane and control plane protocol terminations toward the UEs 601, and are connected to a 5GC via an NG interface (discussed infra).

In V2X scenarios one or more of the RAN nodes 611 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 601 (vUEs 601). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 611 can terminate the air interface protocol and can be the first point of contact for the UEs 601. In some embodiments, any of the RAN nodes 611 can fulfill various logical functions for the RAN 610 including, but not limited to, radio network controller (RNC) functions such as radio bearer management, uplink and downlink dynamic radio resource management and data packet scheduling, and mobility management.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 601 and the RAN nodes 611 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 601 and the RAN nodes 611 may operate using LAA, eLAA, and/or feLAA mechanisms. In these implementations, the UEs 601 and the RAN nodes 611 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 601 RAN nodes 611, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 601, AP 606, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (p); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 601 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 601. The PDCCH carries information about the transport format and resource allocations related to the PDSCH channel, among other things. It may also inform the UEs 601 about the transport format, resource allocation, and HARQ information related to the uplink shared channel. Typically, downlink scheduling (assigning control and shared channel resource blocks to the UE 601b within a cell) may be performed at any of the RAN nodes 611 based on channel quality information fed back from any of the UEs 601. The downlink resource assignment information may be sent on the PDCCH used for (e.g., assigned to) each of the UEs 601.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 611 may be configured to communicate with one another via interface 612. In embodiments where the system 600 is an LTE system (e.g., when CN 620 is an EPC), the interface 612 may be an X2 interface 612. The X2 interface may be defined between two or more RAN nodes 611 (e.g., two or more eNBs and the like) that connect to EPC 620, and/or between two eNBs connecting to EPC 620. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 601 from an SeNB for user data; information of PDCP PDUs that were not delivered to a UE 601; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system (e.g., when CN 620 is an 5GC), the interface 612 may be an Xn interface 612. The Xn interface is defined between two or more RAN nodes 611 (e.g., two or more gNBs and the like) that connect to 5GC 620, between a RAN node 611 (e.g., a gNB) connecting to 5GC 620 and an eNB, and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 630 may be an element offering applications that use IP bearer resources with the core network (e.g., UMTS PS domain, LTE PS data services, etc.). The application server 630 can also be configured to support one or more communication services (e.g., VoIP sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a UPF, and the S1 control plane (NG-C) interface 615, which is a signaling interface between the RAN nodes 611 and AMFs.

In embodiments, the CN 620 may be a 5G CN (referred to as "5GC 620" or the like), while in other embodiments, the CN 620 may be an EPC). Where CN 620 is an EPC (referred to as "EPC 620" or the like), the RAN 610 may be connected with the CN 620 via an S1 interface 613. In embodiments, the S1 interface 613 may be split into two parts, an S1 user plane (S1-U) interface 614, which carries traffic data between the RAN nodes 611 and the S-GW, and the S1-MME interface 615, which is a signaling interface between the RAN nodes 611 and MMES.

Figure 7:
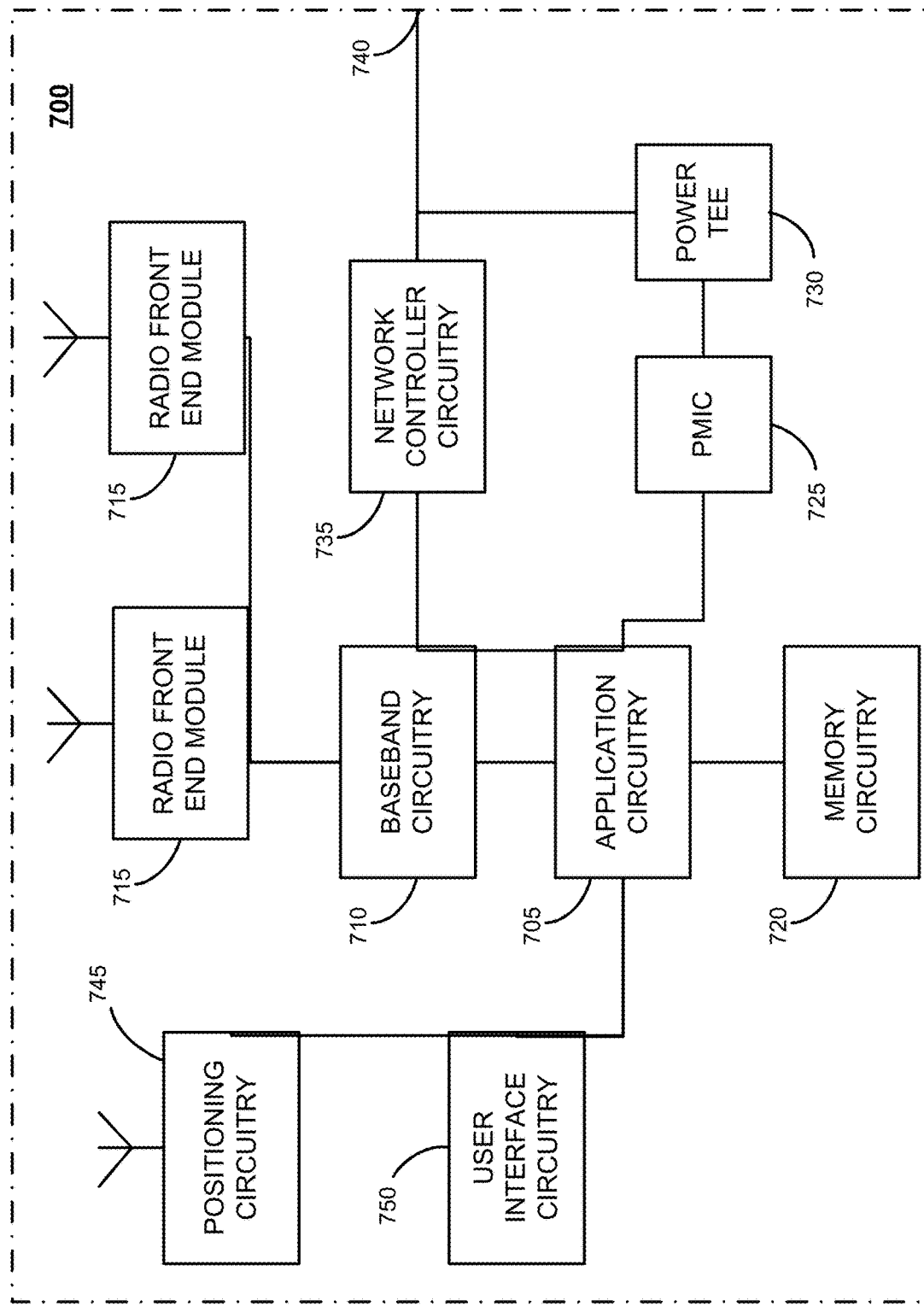
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node such as the RAN nodes 611 and/or AP 606 shown and described previously, application server(s) 630, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 9.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 611, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 8:
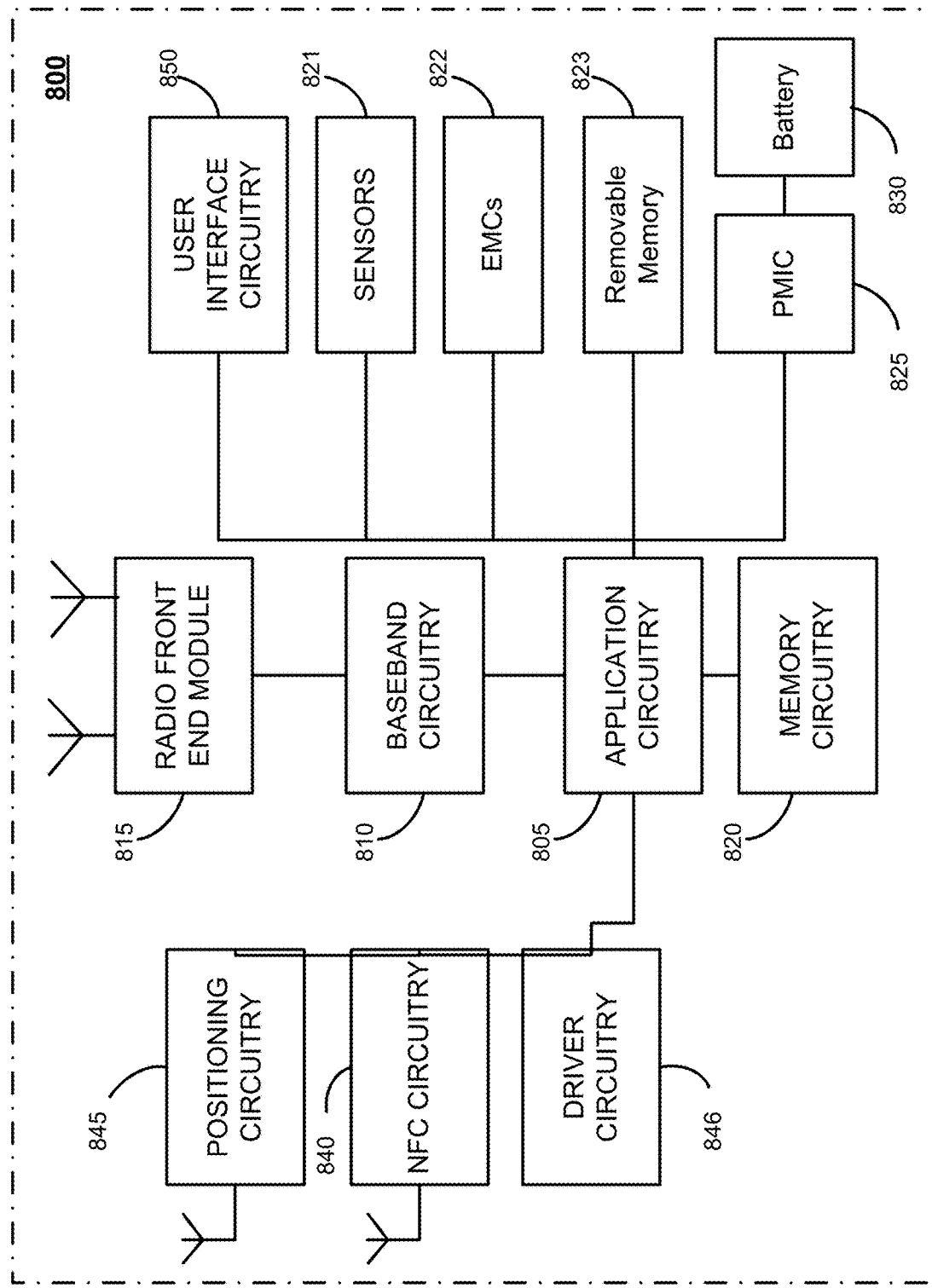
FIG. 8 illustrates an example of a computer platform in accordance with various embodiments.

FIG. 8 illustrates an example of a platform 800 (or "device 800") in accordance with various embodiments. In embodiments, the computer platform 800 may be suitable for use as UEs 601, application servers 630, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 710 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touch-pad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 9:
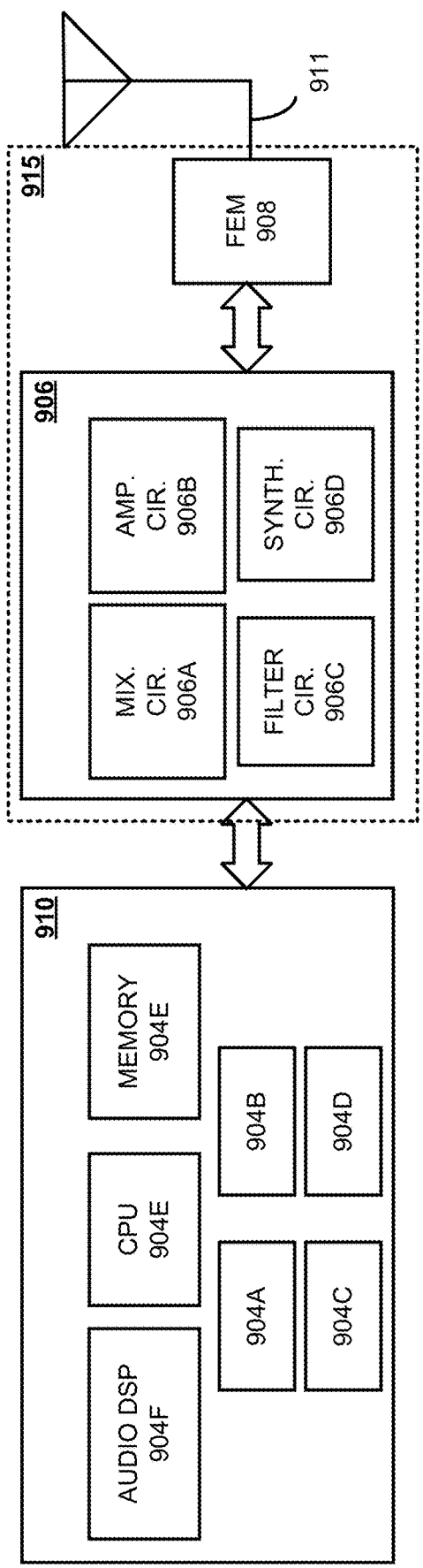
FIG. 9 illustrates example components of baseband circuitry and radio front end modules in accordance with various embodiments.

FIG. 9 illustrates example components of baseband circuitry 910 and radio front end modules (RFEM) 915 in accordance with various embodiments. The baseband circuitry 910 corresponds to the baseband circuitry 710 and 810 of FIGS. 7 and 8, respectively. The RFEM 915 corresponds to the RFEM 715 and 815 of FIGS. 7 and 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 705/805 (see FIGS. 7 and 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 705/805 of FIGS. 7-XT); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 705/805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 705/805 depending on the desired output frequency. In some embodiments, a divider control input (e.g., N) may be determined from a look-up table based on a channel indicated by the application circuitry 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 705/805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 705/805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
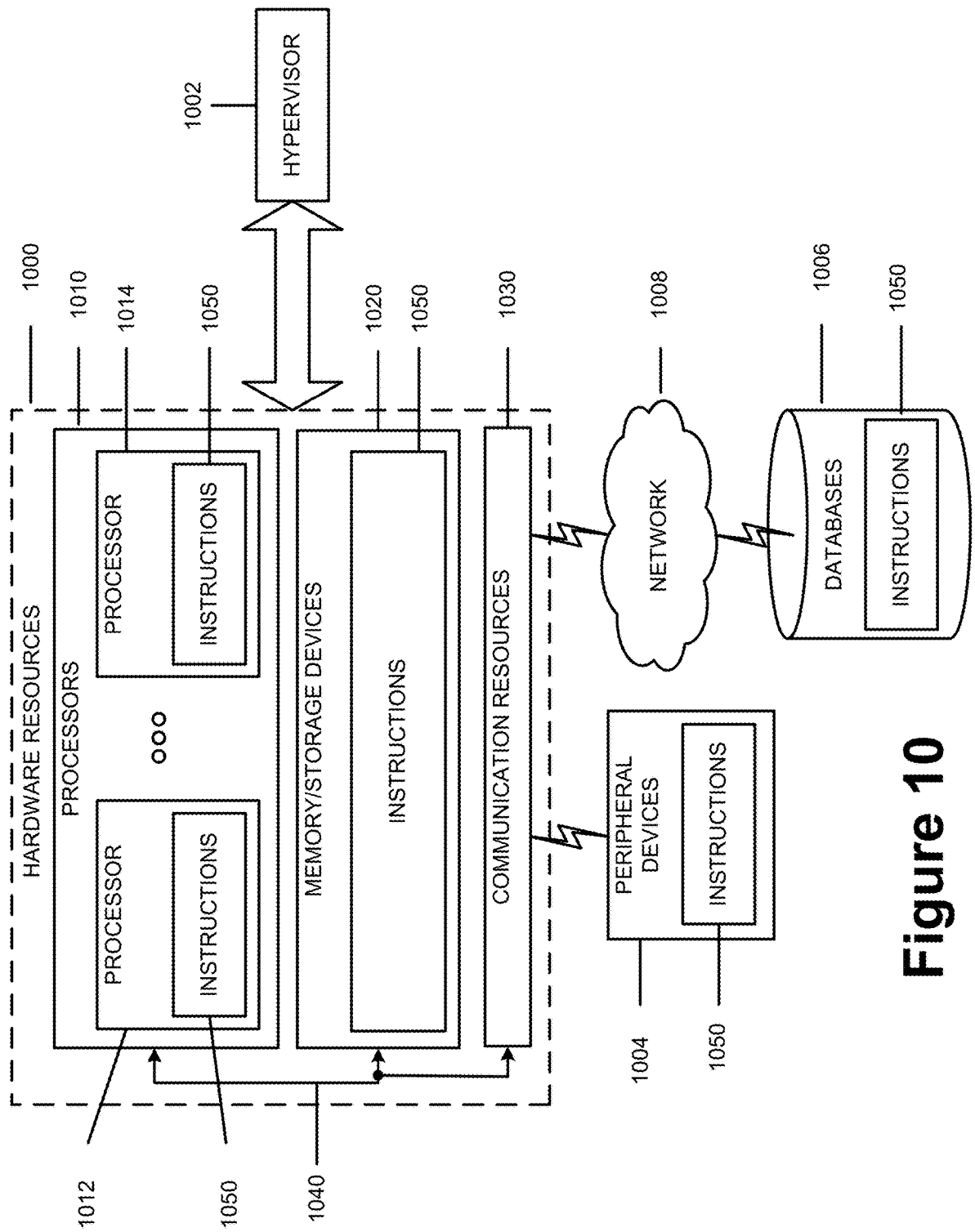
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

Figure 11:
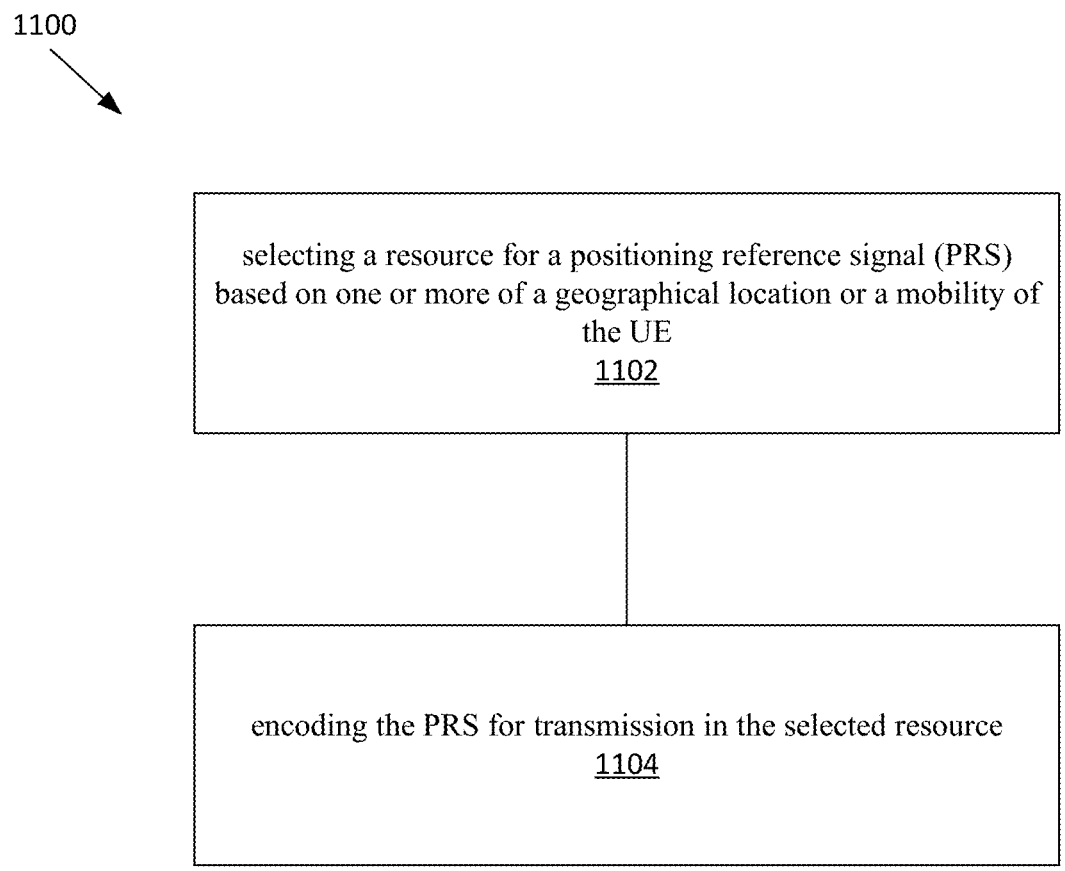
FIG. 11 illustrates a process in accordance with various embodiments.

In some embodiments, the electronic device(s), network (s), system(s), chip(s) or component(s), or portions or implementations thereof, of FIGS. 6-10, or some other figure herein, may be configured to perform one or more processes, techniques, or methods as described herein, or portions thereof. One such process 1100 is depicted in FIG. 11. For example, the process 1100 may include, at 1102, selecting a resource for a positioning reference signal (PRS) based on one or more of a geographical location or a mobility of the UE. At 1104, the process 100 may further include encoding the PRS for transmission in the selected resource. In some embodiments, the process 1100 may be performed by a UE or a portion thereof (e.g., baseband circuitry of the UE).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the method of NR V2X PRS distributed resource scheduling is comprising of:
V2X PRS resource configuration;
V2X PRS resource selection mechanism.
Example 2 may include the method of example 1 or some other example herein, wherein the V2X PRS resource selection mechanism is defined, one or a combination of following approaches can be used:
Random resource selection mechanism;
Predefined resource selection mechanism;
Resource selection based on UE geo-location/telematics information
Resource selection based on signaling from other UE/RSU/TRP/gNB
UE-based resource selection mechanism for PRS resource selection for PRS transmission.

Example 3 may include the method of example 3 or some other example herein, wherein the V2X PRS resource selection mechanism based on random selection approach is defined, is comprising of:
- Pre-configured V2X PRS signal transmission parameters such as size of resources and number of resources, as well as set of sequences that can be used;
- UE-based random selection of the resources within predefined grid of resources and initiation f transmission of V2X PRS signal.

Example 4 may include the method of example 2 or some other example herein, wherein the V2X PRS resource selection mechanism based on predefined selection is defined, is comprising of:
- Pre-configured V2X PRS signal transmission parameters such as size of resources and number of resources, as well as set of sequences that can be used;
- Predefined mapping between physical channels and reference signals based on a function of resource ID and any of UE ID.
- Mechanism for derivation of resource for transmission based on predefined ID (e.g. UE source ID);
- Mechanism for derivation of resource for transmission based on result of sensing procedure.

Example 5 may include the method of example 2 or some other example herein, wherein the V2X PRS resource selection mechanism based on UE geo-location/telematics information is defined, is comprising of:
- Pre-configured V2X PRS signal transmission parameters such as size of resources and number of resources, as well as set of sequences that can be used;
- V2X PRS transmission triggering mechanism based on UE geo-location information;
- V2X PRS transmission triggering mechanism based on time;
- V2X PRS transmission triggering mechanism based on UE movement speed information;
- V2X PRS transmission triggering mechanism based on UE movement acceleration information;
- V2X PRS transmission triggering mechanism based on UE movement heading (wheel rotation angle) information.

Example 6 may include the method of example 2 or some other example herein, wherein the V2X PRS resource selection mechanism based on signaling from other UE/RSU/TRP/gNB is defined, where nearby UE/RSU/TRP/gNB assign or broadcast the initiating signal for PRS transmission with dynamic configurable parameters.

Example 7 may include the method of example 2 or some other example herein, wherein the UE-based V2X PRS resource selection mechanism is defined, where resource for PRS transmission is selected according to resource selection procedure for data transmission.

Example 8 may include the method of example 5 or some other example herein, wherein the V2X PRS transmission triggering mechanism based on UE geo-location information is configured, is comprising of:
- Geographical zones configuration;
- V2X PRS transmission enabling rule.

Example 9 may include the method of example 8 or some other example herein, wherein the Geographical zones configuration is configured, which configuration support one or a combination of following options:
- Predefined geo zoning based on global grid partitioning;
- Road specific predefined geo zoning.

Example 10 may include the method of example 8 or some other example herein, wherein the geographical zones configuration is configured, which description is defined with one or a combination of following options:
- Description of geo zone as 2D rectangular:
  - Center of rectangular is defined as a point in the 2D or 3D coordinate system
  - Rectangular length and width and height are defined
- Description of geo zone as 3D boxes:
  - Center of parallelepiped is defined as a point in the 3D coordinate system
  - Parallelepiped length, width and altitude are defined
- Description of geo zone as 2D circle:
  - Center of circle is defined as a point in the 2D or 3D coordinate system
  - Circle radius is defined
- Description of geo zone as 3D sphere:
  - Center of sphere is defined as a point in the 3D coordinate system
  - Sphere radius is defined
- Description of geo zone based on set of coordinates
  - Set of coordinates in 2D or 3D coordinate space, forming convex figure.

Example 11 may include the method of example 8 or some other example herein, wherein the V2X PRS transmission enabling rule is defined, which is based on following rule:
- A UE cannot transmit any PRS, if UE coordinate with uncertainty radius is outside of the described geo zone
- A UE cannot transmit UL PRS, if UE coordinate with uncertainty radius is partially inside of the described geo area, the UE coordinate uncertainty is bigger than the predefined uncertainty threshold associated with the geo zone
- A UE can transmit UL PRS, if UE coordinate with uncertainty radius is partially inside of the described geo area, the UE coordinate uncertainty is smaller than the predefined uncertainty threshold associated with the geo zone
- A UE can transmit UL PRS, if UE coordinate with uncertainty radius is within of the described geo area.

Example 12 may include the method of example 5 or some other example herein, wherein the V2X PRS transmission triggering mechanism based on UE time is configured, which enables V2X PRS transmission in case if the time period after the last V2X PRS signal transmission exceeds the predefined threshold.

Example 13 may include the method of example 5 or some other example herein, wherein the V2X PRS transmission triggering mechanism based on UE speed information is configured, which enables V2X PRS transmission in case if the UE speed value exceeds the predefined threshold.

Example 14 may include the method of example 5 or some other example herein, wherein the V2X PRS transmission triggering mechanism based on UE acceleration information is configured, which enables V2X PRS transmission in case if the UE acceleration value exceeds the predefined threshold.

Example 15 may include the method of example 5 or some other example herein, wherein the V2X PRS transmission triggering mechanism based on UE heading change information is configured, which enables V2X PRS transmission in case if the UE heading change value exceeds the predefined threshold.

Example 16 may include the method of example 1 or some other example herein, wherein the V2X PRS resource configuration mechanism is defined, where the UE mobility configures following UL PRS transmission parameters:

Periodicity of UL PRS transmission
Instant UL PRS transmission
bandwidth for UL PRS
Tx power
Number of symbols allocated for UL PRS transmission
Number of repetition of UL PRS inside of the same PRS period Example 17 may include the method of example 16 or some other example herein, wherein the V2X PRS transmission periodicity is configured by UE mobility, where UE speed is used in following way:
Defined the speed threshold value above which a UE can transmit UL PRS with maximum periodicity, the maximum UL PRS transmission period size is defined in the system
Defined the speed threshold value below which a UE can transmit UL PRS with minimum periodicity, the minimum UL PRS transmission period size is defined in the system
Defined dependency of UL PRS transmission periodicity from UE speed value.

Example 18 may include the method of example 16 or some other example herein, wherein the V2X PRS transmission periodicity is configured by UE mobility, where UE acceleration is used in following way:
Defined the acceleration threshold value above which a UE can transmit UL PRS with maximum periodicity, the maximum UL PRS transmission period size is defined in the system
Defined the acceleration threshold below which a UE can transmit UL PRS with minimum periodicity, the minimum UL PRS transmission period size is defined in the system
Defined dependency of UL PRS transmission periodicity from UE acceleration value.

Example 19 may include the method of example 16 or some other example herein, wherein the V2X PRS transmission periodicity is configured by UE mobility, where UE heading change is used in following way:
Defined the heading change threshold value above which a UE can transmit UL PRS with maximum periodicity, the maximum UL PRS transmission period size is defined in the system
Defined the heading change threshold below which a UE can transmit UL PRS with minimum periodicity, the minimum UL PRS transmission period size is defined in the system
Defined dependency of UL PRS transmission periodicity from UE heading change value.

Example 20 may include the method of example 16 or some other example herein, wherein the instant V2X PRS transmission is configured by UE mobility, where:
UE initiates single or a set of UL PRS transmissions in case if it's instance acceleration absolute value exceeds the defined value
UE initiates single instant or a set of UL PRS transmissions in case if the UE changes its heading.

Example 21 is a method for improving accuracy of positioning by V2X ranging with stations having predetermined coordinates, comprising: configuring a V2X PRS resource; selecting a V2X PRS resource mechanism, wherein the mechanism is a selected one or more of: random resource, predefined resource, based on UE geo-location/telematics information, based on signaling from other UE/RSU/TRP/gNB, or UE; configuring PRS transmission parameters; and transmitting or receiving PRS transmissions based upon the parameters.

Example 22 may include the method of example 21, or of any other example herein, wherein selecting a random resource mechanism further includes configuring PRS transmission parameters that include a size of resources or a number of resources within a predefined grid of resources.

Example 23 may include the method of example 21, or of any other example herein, wherein selecting a predefined resource mechanism further includes configuring PRS transmission parameters that include a size of resource, a number of resources, or a set of sequences, and a predefined mapping between physical channels and reference signals based on a function of resource ID and of a UE ID.

Example 24 may include the method of example 21, or of any other example herein, wherein selecting based on a UE geo-location/telematics information mechanism further includes configuring PRS transmission parameters that include a size of resources, a number of resources within a predefined grid of resources, or a set of sequences, and a selected one of time, you E movement speed information, UE movement, UE acceleration and UE movement heading.

Example 25 may include one or more non-transitory, computer-readable media (NTCRM) having instructions, stored thereon, that when executed by one or more processors are to cause a user equipment (UE) to: select a resource for a positioning reference signal (PRS) based on one or more of a geographical location or a mobility of the UE; and encode the PRS for transmission in the selected resource.

Example 26 may include the one or more NTCRM of example 25 or some other example herein, wherein the resource is selected based on the geographical location of the UE, and wherein the PRS is triggered when the UE is located in one of a plurality of geographical zones.

Example 27 may include the one or more NTCRM of example 26 or some other example herein, wherein the geographical zones are partitioned in a grid pattern.

Example 28 may include the one or more NTCRM of example 26 or some other example herein, wherein the geographical zones are aligned with one or more roads.

Example 29 may include the one or more NTCRM of example 26 or some other example herein, wherein the resource is further selected based on an uncertainty radius associated with the location of the UE.

Example 30 may include the one or more NTCRM of example 25 or some other example herein, wherein the resource is selected based on the mobility of the UE.

Example 31 may include the one or more NTCRM of example 30 or some other example herein, wherein the mobility includes one or more of a speed, an acceleration, or a heading change of the UE.

Example 32 may include the one or more NTCRM of example 30-31 or some other example herein, wherein, to select the resource, the UE is to determine a periodicity of the PRS transmission based on the mobility of the UE.

Example 33 may include the one or more NTCRM of example 30-32 or some other example herein, wherein, to select the resource, the UE is to determine that the PRS transmission is triggered based on the mobility of the UE.

Example 34 may include the one or more NTCRM of example 30-33 or some other example herein, wherein the instructions, when executed, are further to cause the UE to determine one or more of the following parameters for the PRS transmission based on the mobility of the UE: a bandwidth, a transmission power, a number of symbols allocated to the PRS transmission, and/or a number of repetitions of the PRS within a PRS period.

Example 35 may include an apparatus comprising means to perform one or more elements of a method described in or related to any of examples 1-34, or any other method or process described herein.

Example 36 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 37 may include an apparatus comprising logic, modules, or circuitry to perform one or more elements of a method described in or related to any of examples 1-24, or any other method or process described herein.

Example 38 may include a method, technique, or process as described in or related to any of examples 1-34, or portions or parts thereof. Example 39 may include an apparatus comprising: one or more processors and one or more computer-readable media comprising instructions that, when executed by the one or more processors, cause the one or more processors to perform the method, techniques, or process as described in or related to any of examples 1-34, or portions thereof.

Example 40 may include a signal as described in or related to any of examples 1-34, or portions or parts thereof.

Example 41 may include a datagram, packet, frame, segment, protocol data unit (PDU), or message as described in or related to any of examples 1-34, or portions or parts thereof, or otherwise described in the present disclosure.

Example 42 may include a signal encoded with data as described in or related to any of examples 1-34, or portions or parts thereof, or otherwise described in the present disclosure.

Example 43 may include a signal encoded with a datagram, packet, frame, segment, protocol data unit (PDU), or message as described in or related to any of examples 1-34, or portions or parts thereof, or otherwise described in the present disclosure.

Example 44 may include an electromagnetic signal carrying computer-readable instructions, wherein execution of the computer-readable instructions by one or more processors is to cause the one or more processors to perform the method, techniques, or process as described in or related to any of examples 1-34, or portions thereof.

Example 45 may include a computer program comprising instructions, wherein execution of the program by a processing element is to cause the processing element to carry out the method, techniques, or process as described in or related to any of examples 1-34, or portions thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions stored thereon that, when executed by one or more processors of a user equipment (UE), are to cause the UE to:
identify a resource selection procedure related to data transmission from the UE;
identify a geographical location or a mobility of the UE;
select, based on (A) the resource selection procedure related to data transmission from the UE, and (B) the geographical location or mobility of the UE, a resource for transmission of a positioning reference signal (PRS); and
transmit the PRS in the selected resource.

2. The one or more NTCRM of claim 1, wherein the resource is selected based on the geographical location of the UE, and wherein the PRS is triggered when the UE is located in one of a plurality of geographical zones.

3. The one or more NTCRM of claim 2, wherein the geographical zones are partitioned in a grid pattern.

4. The one or more NTCRM of claim 2, wherein the geographical zones are aligned with one or more roads.

5. The one or more NTCRM of claim 2, wherein the resource is further selected based on an uncertainty radius associated with the location of the UE.

6. The one or more NTCRM of claim 1, wherein the resource is selected based on the mobility of the UE.

7. The one or more NTCRM of claim 6, wherein the mobility includes one or more of a speed, an acceleration, or a heading change of the UE.

8. The one or more NTCRM of claim 6, wherein, to select the resource, the UE is to determine a periodicity of the PRS transmission based on the mobility of the UE.

9. The one or more NTCRM of claim 6, wherein, to select the resource, the UE is to determine that the PRS transmission is triggered based on the mobility of the UE.

10. The one or more NTCRM of claim 6, wherein the instructions, when executed, are further to cause the UE to determine one or more of the following parameters for the PRS transmission based on the mobility of the UE: a bandwidth, a transmission power, a number of symbols allocated to the PRS transmission, and/or a number of repetitions of the PRS within a PRS period.

11. A user equipment (UE) comprising:
baseband circuitry configured to:
identify a resource selection procedure related to data transmission from the UE;
identify a physical parameter of the UE;
select, based on the resource selection procedure and the physical parameter of the UE, a resource for transmission of a vehicle to anything (V2X) positioning reference signal (PRS); and
encode the V2X PRS for transmission based on the selected resource; and
radio frequency (RF) circuitry configured to transmit the V2X PRS based on the selected resource.

12. The UE of claim 11, wherein the physical parameter is a geographical location of the UE, and wherein selection of the resource is triggered by identification that the UE is located in one of a plurality of geographical zones.

13. The UE of claim 12, wherein the plurality of geographical zones are partitioned in a grid pattern or the geographical zones are aligned with one or more roads.

14. The UE of claim 11, wherein the physical parameter is related to mobility of the UE.

15. The UE of claim 14, wherein the mobility of the UE is related to speed of the UE, acceleration of the UE, or a heading change of the UE.

16. An apparatus for use in a user equipment (UE), wherein the apparatus comprises:
one or more processors; and
one or more non-transitory computer-readable media (NTCRM) comprising instructions that, upon execution of the instructions by the one or more processors, are to cause the UE to:
identify occurrence of an event related to a physical parameter of the UE;
identify a resource selection procedure related to data transmission from the UE,
select, based on the occurrence of the event and the resource selection procedure, a resource for transmission of a vehicle to anything (V2X) positioning reference signal (PRS);
encode the V2X PRS for transmission based on the selected resource; and
transmit the V2X PRS based on the selected resource.

17. The apparatus of claim 16, wherein the event is related to identification of the UE in one of a plurality of geographical zones.

18. The apparatus of claim 17, wherein the plurality of geographical zones are partitioned in a grid pattern or the geographical zones are aligned with one or more roads.

19. The apparatus of claim 16, wherein the event is related to occurrence of a mobility parameter of the UE.

20. The apparatus of claim 19, wherein the mobility parameter is related to speed of the UE, acceleration of the UE, or a heading change of the UE.

* * * * *